(12) United States Patent
Chen et al.

(10) Patent No.: US 8,144,289 B2
(45) Date of Patent: Mar. 27, 2012

(54) LIQUID CRYSTAL DISPLAY PANEL, THIN FILM TRANSISTOR ARRAY SUBSTRATE AND CURING LINE STRUCTURE FOR PHASE SEPARATION ALIGNMENT PROCESS

(75) Inventors: Ya-chieh Chen, Hsin-Chu (TW); Jen-lang Tung, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 979 days.

(21) Appl. No.: 12/125,283

(22) Filed: May 22, 2008

(65) Prior Publication Data

US 2008/0291145 A1 Nov. 27, 2008

(30) Foreign Application Priority Data

May 25, 2007 (TW) ................................ 96118769 A (51) Int. Cl.
*G02F 1/1333* (2006.01)
*G02F 1/1347* (2006.01)
*G02F 1/1337* (2006.01)
*G02F 1/1343* (2006.01)

(52) U.S. Cl. ............ 349/84; 349/77; 349/123; 349/141; 349/158; 345/92

(58) Field of Classification Search ............... 349/84, 349/77, 123, 141, 158; 345/92
See application file for complete search history.

(56) References Cited

U.S. PATENT DOCUMENTS

| 5,640,216 | A | * | 6/1997 | Hasegawa et al. | ............ 349/58 |
| 5,684,555 | A | * | 11/1997 | Shiba et al. | ................ 349/149 |
| 2002/0038893 | A1 | | 4/2002 | Wong | |
| 2005/0157232 | A1 | | 7/2005 | Yoon et al. | |
| 2006/0009108 | A1 | | 1/2006 | Shigeno | |
| 2006/0023135 | A1 | | 2/2006 | Park | |
| 2006/0028591 | A1 | | 2/2006 | Kim | |
| 2006/0244741 | A1 | | 11/2006 | Kimura et al. | |
| 2008/0002133 | A1 | | 1/2008 | Lin | |
| 2010/0053058 | A1 | * | 3/2010 | Nagashima et al. | ............ 345/98 |

FOREIGN PATENT DOCUMENTS

| JP | 2004070308 | 3/2004 |
| TW | 500937 | 9/2002 |
| TW | 253538 B | 4/2006 |
| TW | 271691 B | 1/2007 |
| WO | 2004017128 A1 | 2/2004 |

* cited by examiner

*Primary Examiner* — Mike Qi (74) *Attorney, Agent, or Firm* — Kirton McConkie; Evan R. Witt (57) ABSTRACT

The present invention discloses a liquid crystal display panel, a thin film transistors array substrate and curing line structure thereof in use of phase separation alignment (PSA) process. The curing line structure has a contact pad allocated on a periphery area of the substrate, and a transmission line extending from the contact pad, passing over a sealant-distributing area of the substrate, to be electrically connected with at least one common line located on a pixel expression area of the substrate. A predetermined interval is kept between the transmission line and each of the adjacent transmission lines on the substrate to ensure a non-electrical contact between the transmission line and the adjacent transmission lines.

16 Claims, 8 Drawing Sheets

LIQUID CRYSTAL DISPLAY PANEL, THIN FILM TRANSISTOR ARRAY SUBSTRATE AND CURING LINE STRUCTURE FOR PHASE SEPARATION ALIGNMENT PROCESS

FIELD OF THE INVENTION

The present invention relates to a display panel, a substrate and a line structure thereof, and more particularly to a liquid crystal display panel, a thin film transistor (TFT) array substrate and a curing line structure for phase separation alignment (PSA) process.

BACKGROUND OF THE INVENTION

Figure 1A:
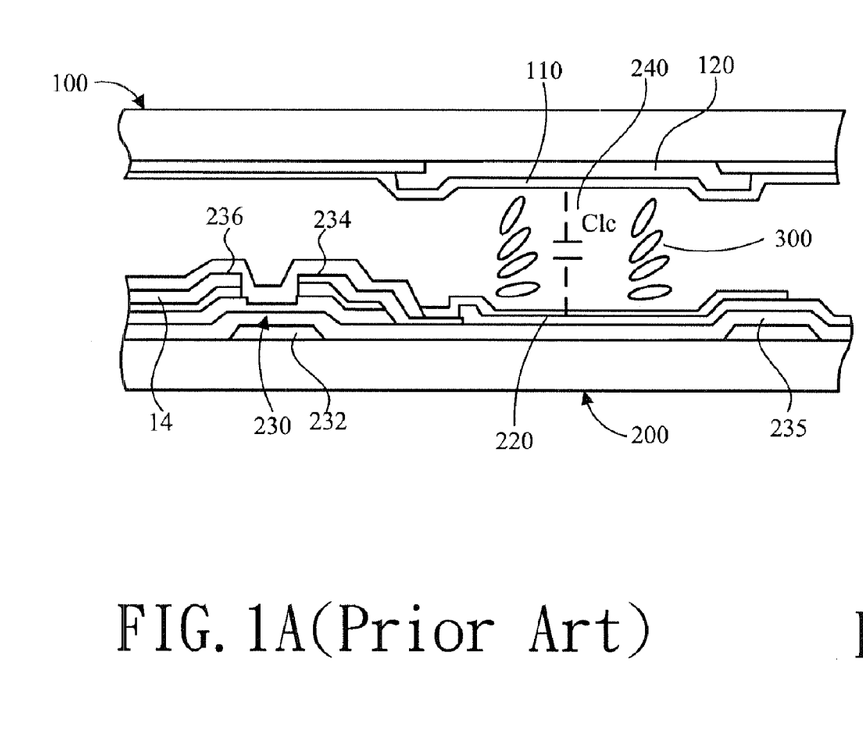
FIG. 1A is a schematic cross-sectional view of a conventional liquid crystal display panel.
Figure 1B:
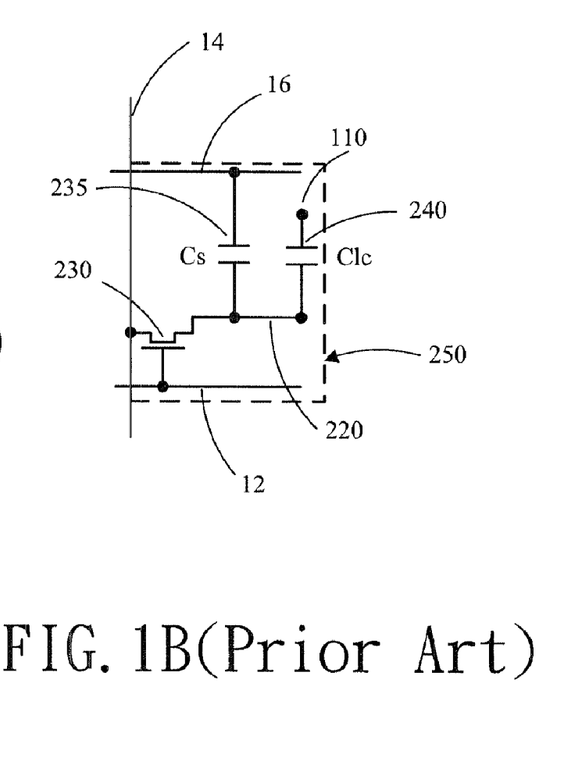
FIG. 1B is a schematic view of one control circuit which is composed of a pixel of the conventional liquid crystal display panel shown in FIG. 1A.
Figure 1C:
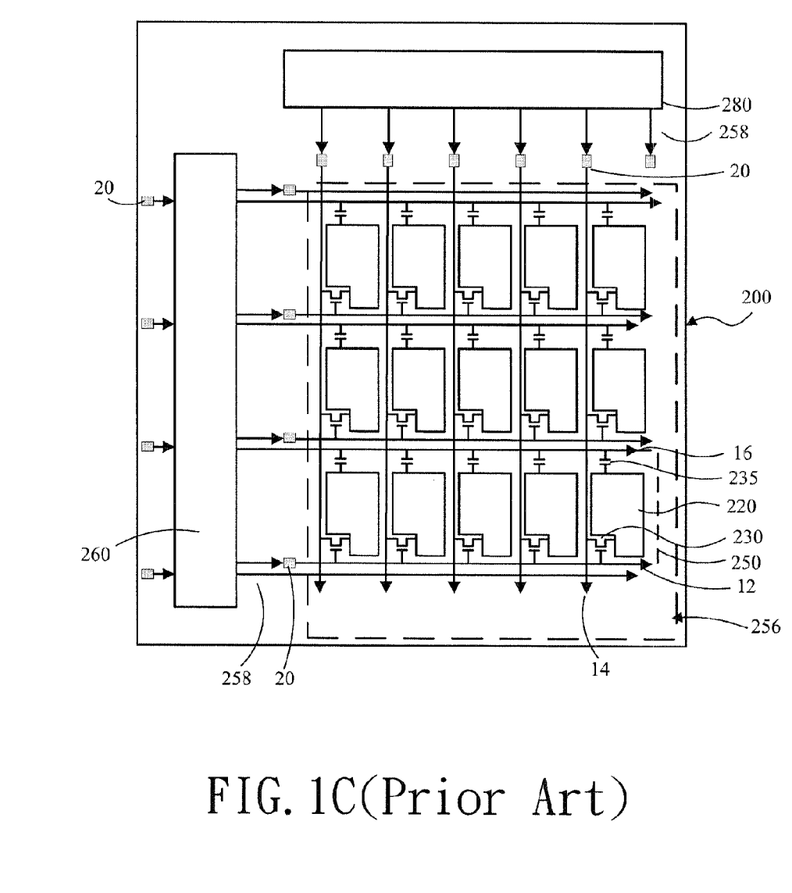
FIG. 1C is a schematic view of one control circuit of a thin film transistor substrate in the conventional liquid crystal display panel shown in FIG. 1A.

FIG. 1A is a schematic cross-sectional view of a conventional liquid crystal display panel. The liquid crystal display panel includes a first substrate 100, a second substrate 200 opposite to the first substrate 100, a material of liquid crystal (LC) 300 sealed between the first substrate 100 and the second substrate 200, and a backlight module (not shown) positioned back on the second substrate 200 to be served as a light source. A color filter 120 is disposed on internal surface of the first substrate 100 for providing each pixel with colors. Further, a layer of indium tin oxide (ITO) is coated on the color filter 120 and the internal surface of the first substrate 100 to serve as a common electrode 110. As shown in FIG. 1C, the second substrate 200 is a thin film transistor (TFT) array substrate. The internal surface of the thin film transistor array substrate includes a plurality of TFTs 230 at an array arrangement, a plurality of gate lines 12 at a horizontal arrangement, and a plurality of source lines 14 at a vertical arrangement. In FIGS. 1B and 1C, a TFT 230, a pixel electrode 220, a storage capacitor ($C_s$) 235, a LC capacitor ($C_{LC}$) 240 form a unit pixel 250 near the intersection of each gate line 12 and each source line 14 and thus, a plurality of pixels are formed on the second substrate 200. The TFT 230 has a gate, a source, and a drain for electrically connecting to the gate line 12, the source line 14, and the pixel electrode 220, respectively. The storage capacitor ($C_s$) 235 consists of a common line 16, the pixel electrode 220 and a dielectric layer therebetween, while the LC capacitor ($C_{LC}$) 240 consists of the common electrode 110, the pixel electrode 220 and the material of liquid crystal therebetween at the pixel. As shown FIG. 1C, the gate line 12, the source line 14 and the common line 16 on the second substrate 200, respectively, extend from a pixel display area 256 to a periphery area 258 for connecting to each of the bonding pads 20 correspondingly and inputting a control signal or a control voltage via the bonding pads 20. The gate line 12 and the source line 14 are electrically connected to a scan driving circuit (or scan driving chip) 260 and a data driving circuit (or a data driving chip) 280, respectively, via the bonding pad 20. Furthermore, the scan driving circuit 260 and the data driving circuit 280 are positioned on the periphery area 258 outside the pixel display area 256 of the TFT array substrate 200. In one embodiment, the common line 16 is in a ground connection. In another case, an external voltage is inputted to the common line 16 via the bonding pad 20.

When the scan driving circuit 260 outputs a pulse signal to the gates of the TFTs 230 via the bonding pad 20 and the gate line 12, the TFTs 230 turn on for writing the data signal of the source line 14 to the LC capacitor ($C_{LC}$) 240 and the storage capacitor ($C_s$) 235 via the gates and drains of the TFTs 230. Then, an electric field between the common electrode 110 and the pixel electrode 220 is generated for controlling the twist direction of the liquid crystal molecules in a material of liquid crystal 300 so that the light emitted from the backlight module penetrates the liquid crystal molecules and a pixel color is thus formed on the first substrate 100, as shown in FIG. 1A. Conversely, when the pulse signal is in off-state, the TFTs 230 turn off so that the data written into the LC capacitor ($C_{LC}$) 240 and the storage capacitor ($C_s$) 235 are kept invariant. That is, the display signal is kept in constant on the pixel 250 so that each pixel 250 serves as the function of memorization until the pulse signal is in on-state.

Based on the alignment process, the twist angle and the driving method of the liquid crystal, the LCD is usually classified into a twisted nematic (TN) type, a super twisted nematic (STN) type, and a thin film transistor (TFT) type. The full color of LCD which is applicable to some of the electronic devices, such as computer, adopts the thin film transistor (TFT) type, e.g. active matrix thin film transistor liquid crystal display.

For the purpose of controlling the display efficiency during the conventional display process, it is required to perform an alignment process on the TFT array substrate and the color filter substrate of the LCD for forming an alignment layer in order to conduct the liquid crystal molecules between the top and bottom substrates along a specific direction and generate a pre-tilt angle. For example, during the process of polymer-dispersed liquid crystal, a polymer-induced phase separation (PIPS) technique is utilized. The PISP technique includes the following steps: (1) mixing the photo-polymerizable monomers with the liquid crystal at a predetermined ratio and then sealing the mixed material to be positioned between the top and bottom substrates for forming a predetermined thickness of liquid crystal cells; (2) when UV light irradiates on one side of the liquid crystal cells, the polymerization occurs and then a polymer film is formed near the surfaces of the liquid crystal cells on which the UV light illuminates. Further, when the liquid crystal separates from the polymer, the liquid crystal is far away from the surfaces of the liquid crystal cells on which the UV light illuminates and moves to the center of the liquid crystal cells, which is named as phase separation effect. Since the alignment layer between the top and bottom substrates is capable of orientating liquid crystal molecules, the aligned liquid crystal molecules are generated based on the function of the alignment layer. Such a process of alignment layer has the same function and better alignment as to the conventional process of the alignment of the liquid crystal, such as a rubbing step, a photo-alignment step and a photo-sensitive step.

Figure 2A:
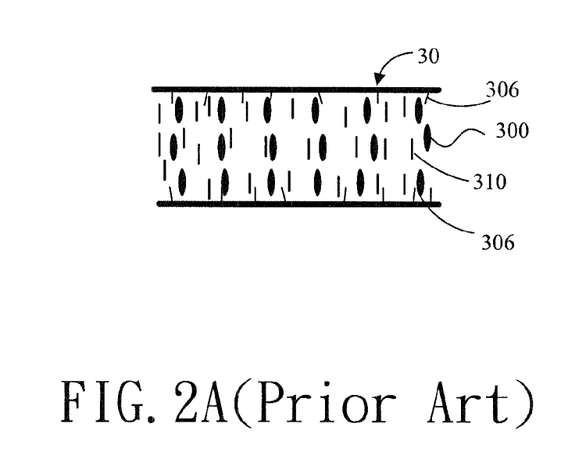
FIGS. 2A-2D are schematic steps of manufacturing a conventional phase separation alignment.
Figure 2B:
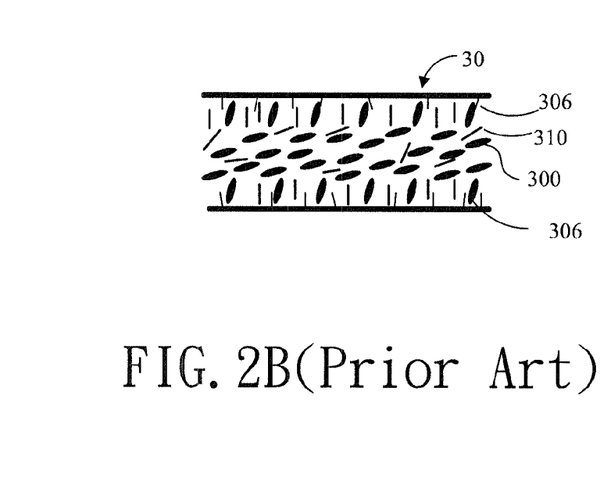
Figure 2C:
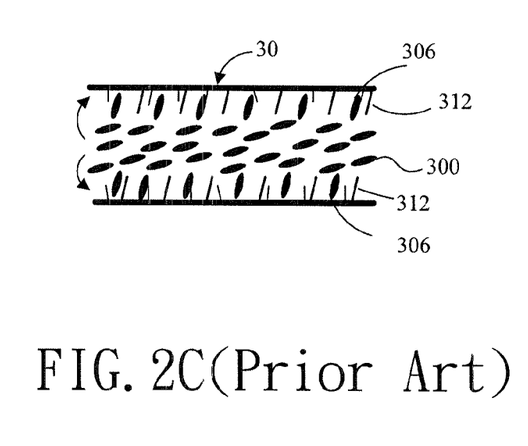
Figure 2D:
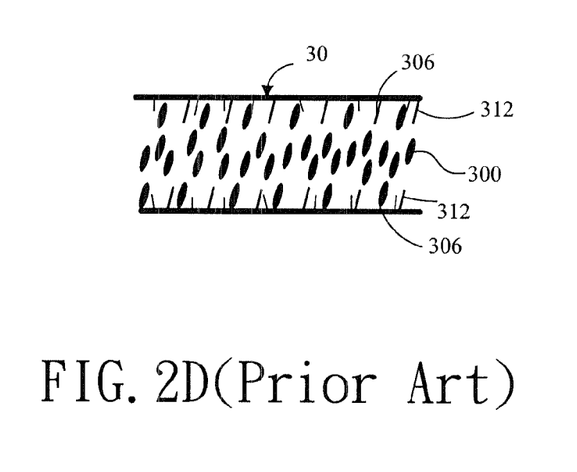

FIG. 2A shows another case of PSA process. Some photo-curable monomers 310 are mixed with the material of liquid crystal (LC) 300 and the mixed material is sealed between the top and bottom substrates to form the predetermined thickness of liquid crystal cells 30. Furthermore, each the internal surface of the liquid crystal cells 30 near the top and bottom substrates has a polyimide (PI) layer 306 (not clearly shown), made by such as a rubbing step. Afterwards, as shown in FIG. 2B, when a low level curing voltage is applied on the electrodes of the top and bottom substrates for generating an electric filed (E) between the top and bottom substrates in order to control liquid crystal molecules in the material of liquid crystal (LC) 300 tilted at a predetermined direction. However, the electric filed (E) does not exert the force on the monomers 310, thereby generate a phase separation status. As shown in FIG. 2C, when the curing voltage is exerted, the UV light irradiates the liquid crystal cells for curing the monomers 310 by polymerization to respectively form a polymer layer 312 on the internal surfaces of the top and bottom substrates. As shown in FIG. 2D, when the curing voltage is dispersed to vanish the electric field, the function of polymer layers 312 on the internal surfaces of the top and bottom substrates is similar to the function of a conventional alignment layer. That is, based on the arrangement direction of the polymer in the polymer layer 312, the liquid crystal molecules (LC) 300 of the liquid crystal cells 30 tilt at a pre-tilt angle. If the alignment for the liquid crystal molecules is invalid, the refraction direction of the light is incorrect, thereby resulting in incorrect display of the LCD.

SUMMARY OF THE INVENTION

One objective of the present invention is to provide a liquid crystal display panel, a thin film transistor (TFT) array substrate and a curing line structure for phase separation alignment (PSA) process. During the curing step of the phase separation alignment (PSA) process, the problem of burned down phenomenon of the transmission line due to high resistivity is solved for increasing the yield rate of the liquid crystal display panel.

According to the objectives, the present invention sets forth a liquid crystal display panel, a thin film transistor (TFT) array substrate and a curing line structure for phase separation alignment (PSA) process.

The curing line structure includes a contact pad and a transmission line. The contact pad is positioned on a periphery area of the substrate. The transmission line extends from the contact pad and passes over the sealant-distributing area for entering the display area of the substrate. The transmission line is electrically connected to at least one common line within the display area. In other words, the transmission line does not indirectly connected to the common line via the other transmission lines, that is, the transmission line is not electrically connected to the common line by a striding, bridging, or through-hole connection. Moreover, the transmission line separates from the adjacent transmission line at a predetermined interval. The predetermined interval ensures that the transmission line electrically isolates from the other transmission lines. If the transmission line is electrically connected to the other adjacent transmission line on the first substrate and thus a striding, bridging, or through-hole connection is utilized, it is required that the striding, bridging, or through-hole connection needs to be positioned outside the sealant-distributing area, such as within the periphery area.

BRIEF DESCRIPTION OF THE DRAWINGS

The foregoing aspects and many of the attendant advantages of this invention will become more readily appreciated as the same becomes better understood by a reference to the following detailed description, when taken in conjunction with the accompanying drawings, wherein.

DETAILED DESCRIPTION OF THE INVENTION

In the present invention, the liquid crystal display panel suitable for a polymerization alignment process, such as a polymer stabilization alignment or a phase separation alignment (PSA) process, includes a first substrate, a second substrate opposite to the first substrate, a material of liquid crystal (LC) sealed between the first substrate and the second substrate, and a backlight module serving as a light source. The first substrate is a thin film transistor (TFT) array substrate. The internal surface of the thin film transistor array substrate has a plurality of TFTs at an array arrangement, a plurality of scan lines or gate lines disposed at a horizontal arrangement, a plurality of data lines or source lines (not shown) 14 disposed at a vertical arrangement, and a plurality of common lines. Each of the scan lines intersects each of the data lines and each intersection of the scan lines and the data lines has a transistor having a gate, a source, and a drain. The gate is electrically connected to the scan line, the source is electrically connected to the data line, and the drain is electrically connected to a pixel electrode for controlling the twist direction of the liquid crystal. As shown in FIG. 1B, a pixel is composed of the thin film transistor (TFT), the pixel electrode, a storage capacitor ($C_s$), and a liquid crystal (LC) capacitor ($C_{LC}$). Each of the common lines is electrically connected to the corresponding storage capacitor ($C_s$) of each pixel. The scan lines and the data lines are electrically connected to the scan driving chips and the data driving chips, respectively. The second substrate, the thin film transistor (TFT), the driving chips, the pixel electrode, the storage capacitor ($C_s$) and the liquid crystal (LC) capacitor ($C_{LC}$) can be various types which are similar to or the same as these in FIGS. 1A-1C.

Figure 3A:
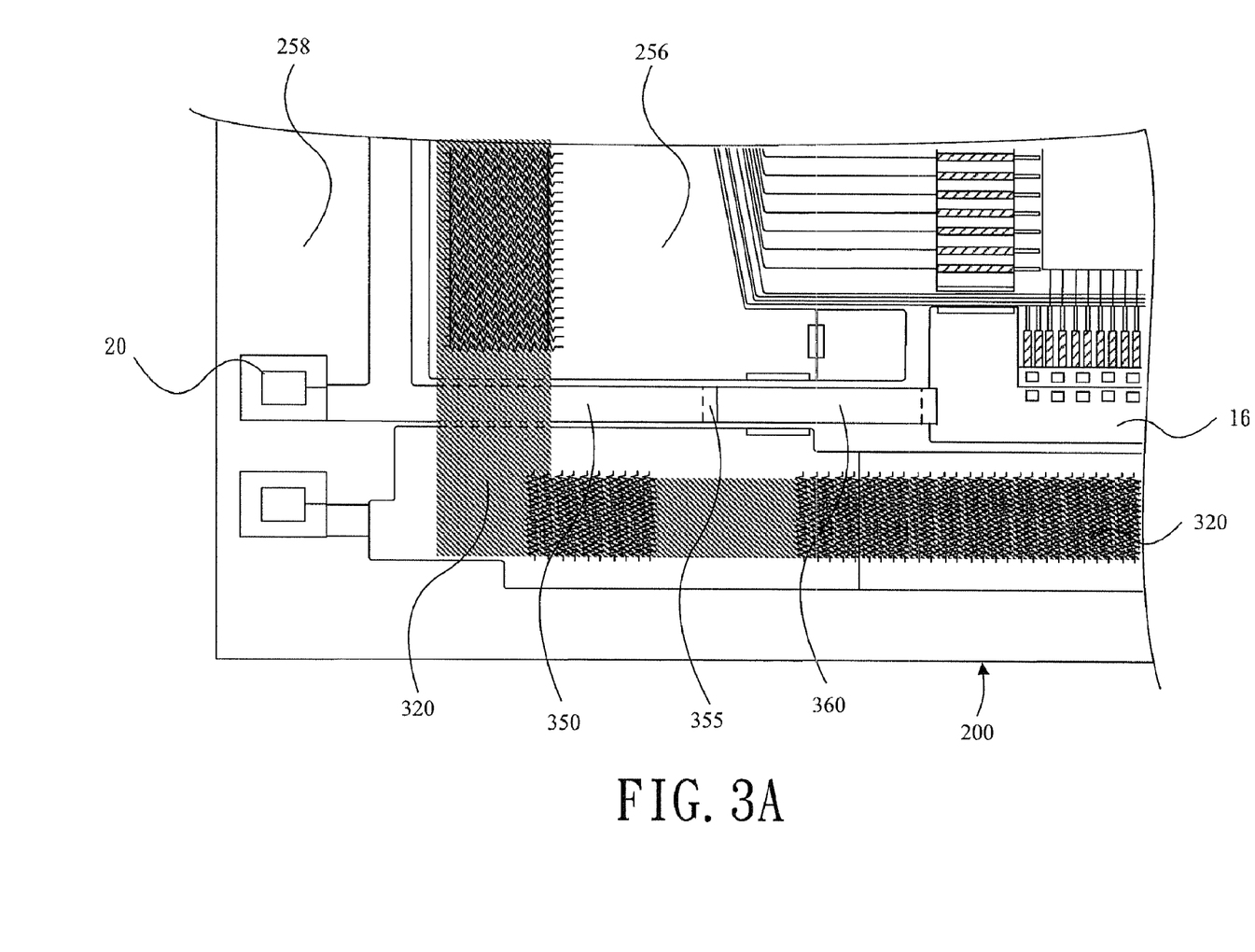
FIG. 3A is a schematic partial view of a first architecture of the thin film transistor substrate correspondingly shown in FIG. 1C, wherein the partial view shows a portion of gate side located on the substrate.

FIG. 3A is a schematic partial view of a first architecture of the present thin film transistor substrate shown in FIG. 1C, in which the partial view shows a portion of gate side located on the substrate. Before performing the PSA process, it is necessary to coat the sealant on a sealant-distributing area 320 surrounding the pixel display area 256 of the first substrate 100. The first substrate 100 and the second substrate 200 are assembled by the sealant so that the pixel display area 256 is isolated from the periphery area 258 by the sealant. Afterwards, the material of liquid crystal (LC) 300 is injected into the pixel display area 256 between the first substrate 100 and the second substrate 200 and the material of liquid crystal (LC) 300 is sealed between the first substrate 100 and the second substrate 200. Then, the PSA process is performed. Since a low level curing voltage is applied on the electrodes of the top and bottom substrates for tilting the liquid crystal molecules in the material of liquid crystal (LC) 300 at a predetermined direction and a UV curing step is then performed, therefore, a curing pad 20 should be designed and positioned at the gate side (an area non-occupied by the scan driving chip 260) within the periphery area 258 of the second substrate 200. Further, the transmission line 350 is electrically connected to the common lines 16 of the pixels 250 within the pixel display area 256 of the second substrate 200. The curing voltage is first inputted into the bonding pad 20 and then transmitted to the storage capacitor ($C_s$) 235 corresponding to the pixel 250 within the pixel display area 256 via other transmission lines 360 made of indium tin oxide (ITO) and common lines 16. Before the transmission line 350 of the bonding pad 20 is electrically connected to the common line 16, most of the transmission lines 350 are electrically connected to other transmission lines by striding across, bridging to, or passing over across the bottom of the sealant-distributing area 320. As shown in FIG. 3A, the transmission line 350 of the bonding pad 20 and the other adjacent transmission lines 360 of the indium tin oxide (ITO) layers forms a connecting area 355. During the curing step of PSA process, the resistance of the transmission line 350 of the bonding pad 20 within the connecting area 355 is increased and the transmission line 350 burns down. Thus, the curing voltage cannot be supplied into the pixels 250 causing the liquid crystal display panel failed. Moreover, if the connecting area 355 is located within the sealant-distributing area 320, the transmission line 350 burns down more easily.

Figure 3B:
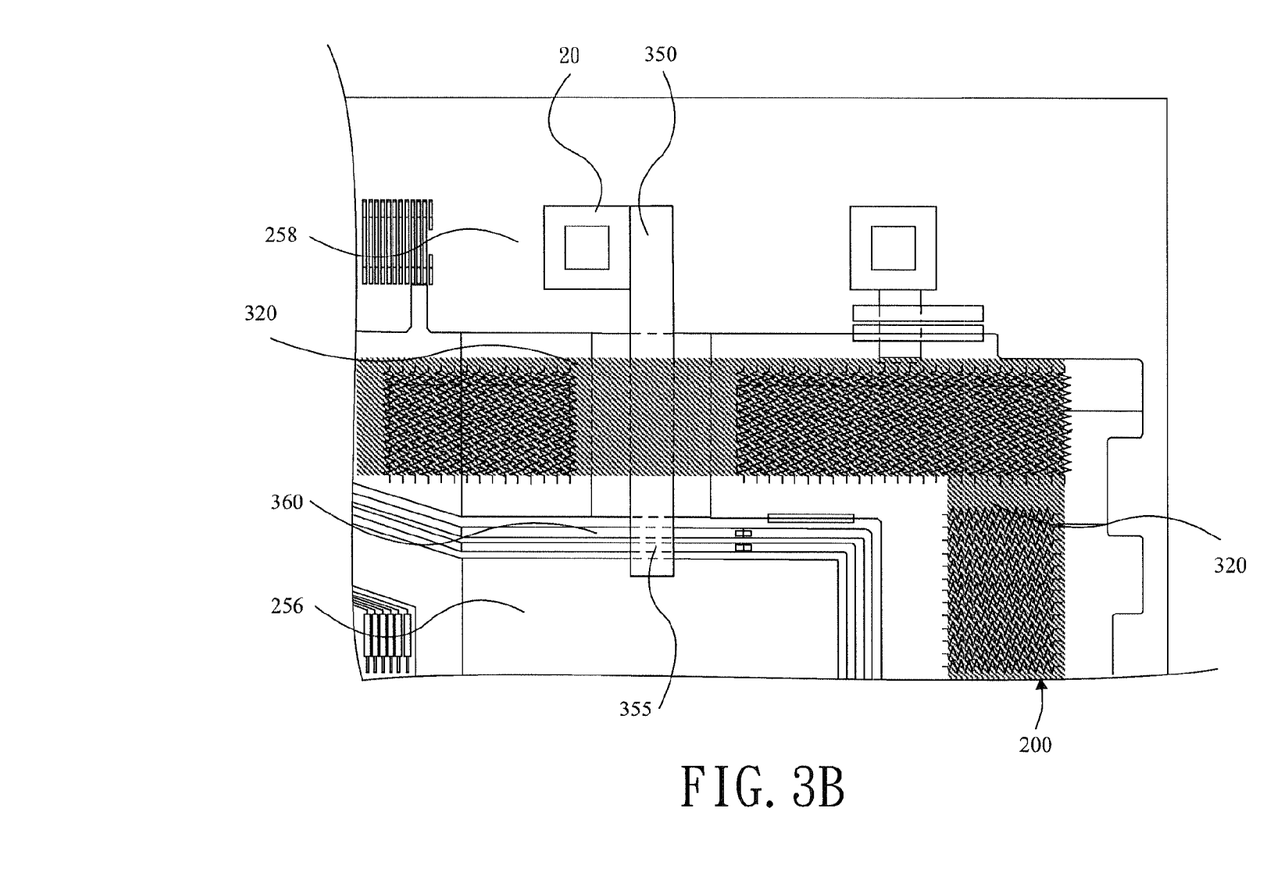
FIG. 3B is a schematic partial view of a second architecture of the thin film transistor substrate correspondingly shown in FIG. 1C, wherein the partial view shows a portion of source side located on the substrate.

FIG. 3B is a schematic partial view of a second architecture of the present thin film transistor substrate shown in FIG. 1C, in which the partial view shows a portion of source side on the substrate 200. The bonding pad 20 is located at source side of the second substrate 200. When the transmission line 350 of the bonding pad 20 extends from the periphery area 258 and enters the pixel display area 256 via the sealant-distributing area 320, the transmission line 355 and the other transmission lines 360 form a striding area 355. Similarly, during the curing step of PSA process, the resistance of the transmission line 350 of the bonding pad 20 within the striding area 355 is increased and the transmission line 350 easily burns down.

Figure 3C:
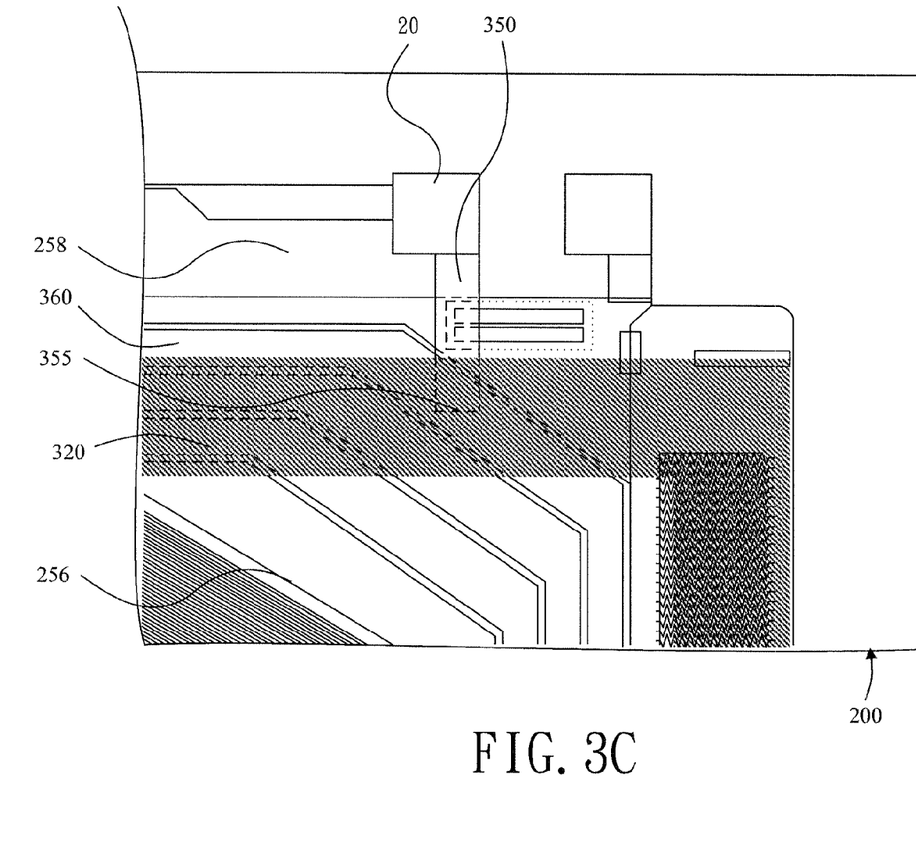
FIG. 3C is a schematic partial view of a third architecture of the thin film transistor substrate correspondingly shown in FIG. 1C, wherein the partial view shows a portion of source side located on the substrate.

FIG. 3C is a schematic partial view of a third architecture of the present thin film transistor substrate shown in FIG. 1C, wherein the partial view shows a portion of source side located on the substrate 200. The bonding pad 20 is located at source side of the second substrate 200. When the transmission line 350 of the bonding pad 20 extends from the periphery area 258 and enters the pixel display area 256 via the sealant-distributing area 320, the transmission line 355 and the other transmission lines 360 form a bridging area 355. Similarly, during the curing step of PSA process, the resistance of the transmission line 350 of the bonding pad 20 within the connecting area 355 is increased and the transmission line 350 easily burns down. Thus, the curing voltage cannot be supplied into the pixels 250.

Figure 4A:
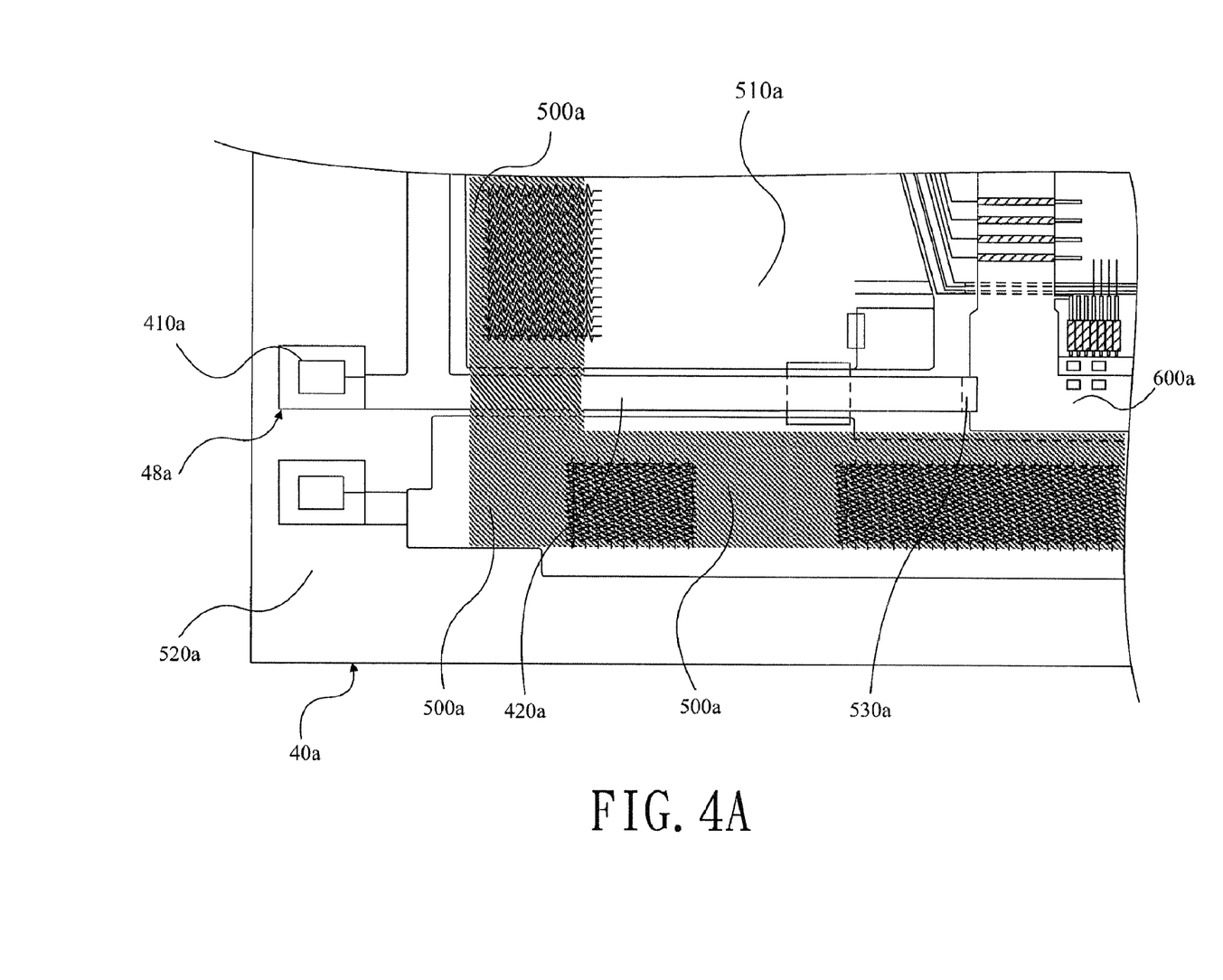
FIG. 4A is a schematic partial view of a thin film transistor substrate according to the first embodiment of the present invention, wherein the partial view shows a portion of gate side located on the substrate.

FIG. 4A is a schematic partial view of a thin film transistor substrate according to the first embodiment of the present invention, wherein the partial view shows a portion of gate side located on the first substrate 40a. Before performing the PSA process, it is necessary to coat the sealant on a sealant-distributing area 500a surrounding a pixel display area 510a of the first substrate 40a. The sealant-distributing area 500a on the first substrate 40a is capable of integrating the first substrate 40a and the second substrate are assembled by the sealant. The first substrate 40a includes the pixel display area 510a and a periphery area 520a wherein the liquid crystal within the pixel display area 510a generates the pixel color. Thus, the pixel display area 510a between the first substrate 40a and the second substrate is surrounded and sealed by the coated sealant wherein the pixel display area 510a is isolated from the periphery area 520a. In other words, the sealant-distributing area 500a is located between the display area 510a and the periphery area 520a. Then, the material of liquid crystal 300 is injected into the pixel display area 510a between the first substrate 40a and the second substrate and the liquid crystal is sealed therein. The pixel display area 510a on the first substrate 40a includes the thin film transistors (TFTs), the common lines 600a, the gate lines and the source lines. The scan driving chips and the data driving chips are electrically connected to the gate lines and the source lines, respectively. Outside the scan driving chips and the data driving chips, a plurality of curing lines 48a enters the pixel display area 510a from the periphery area 520a of the first substrate 40a via the sealant-distributing area 500a.

As shown in FIG. 4A, a curing line structure 48a suitable for a phase separation alignment (PSA) process includes a contact pad 410a and a transmission line 420a. The contact pad 410a is positioned on the periphery area 520a and receives an external control voltage (or curing voltage) to determine a pre-tilt angle of the crystal liquid. In one embodiment, the control voltage is in a direct current (DC) type or an alternating current (AC) type with a relatively high potential. The transmission line 420a extends from the contact pad 410a within the periphery area 520a and passes over the sealant-distributing area 500a for electrically connecting the transmission line 420a to the common line 600a. The common line 600a within the display area 510a may extend to the common electrodes on the first substrate or the second substrate, or connect the scan lines and the data lines (not shown). That is, the transmission line 420a is electrically connected to the common line 600a at a connecting area 530a. In other words, the transmission line 420a does not indirectly connected to the common line 600a across the other transmission lines, that is, the transmission line 420a is not electrically connected to the common line 600a by a striding, bridging, or through-hole connection. Moreover, the transmission line 420a separates from the adjacent other transmission line at a predetermined interval. The predetermined interval ensures that the transmission line 420a electrically isolates from the other transmission lines to prevent the curing line from burning down. During the PSA process, the steps which are similar to the steps in FIG. 2A-2D are performed. A curing voltage, such as a voltage from 15~40 volts (V), are exerted on the contact pad 410a, passes through the transmission line 420a and the common line 600a, and the curing voltage is inputted to the storage capacitor ($C_s$) for generating an electric filed on the liquid crystal between the first substrate and the second substrate. Afterwards, a UV curing step is preformed to form a polymer layer between the first substrate and the second substrate, wherein the polymer layer serves as an alignment layer. By adjusting the arrangement of the polymerized monomers on the PI layer, the liquid crystal is aligned to a pre-tilt angle. Thus, after assembling the liquid crystal display panel, the light from the backlight module has a correct refraction direction based on the aligned liquid crystal so that the pixels of the liquid crystal display panel can display correctly. In one embodiment, the curing line 48a is composed of the metal having low resistance which is lower than the resistivity of indium tin oxide (ITO). The metal having low resistance is selected from a material of aluminum (Al), titanium (Ti), cupper (Cu), neodymium (Nd), molybdenum (Mo) or other metal material and an alloy or a stacked layer thereof, such as aluminum/neodymium (Al/Nd), or molybdenum/aluminum/molybdenum (Mo/Al/Mo). The metal having low resistance may be stacked with a metal like material, such as titanium nitride (TiNx). Therefore, the curing line 48a is capable of bearing a curing voltage having high level to avoid burning down.

Figure 4B:
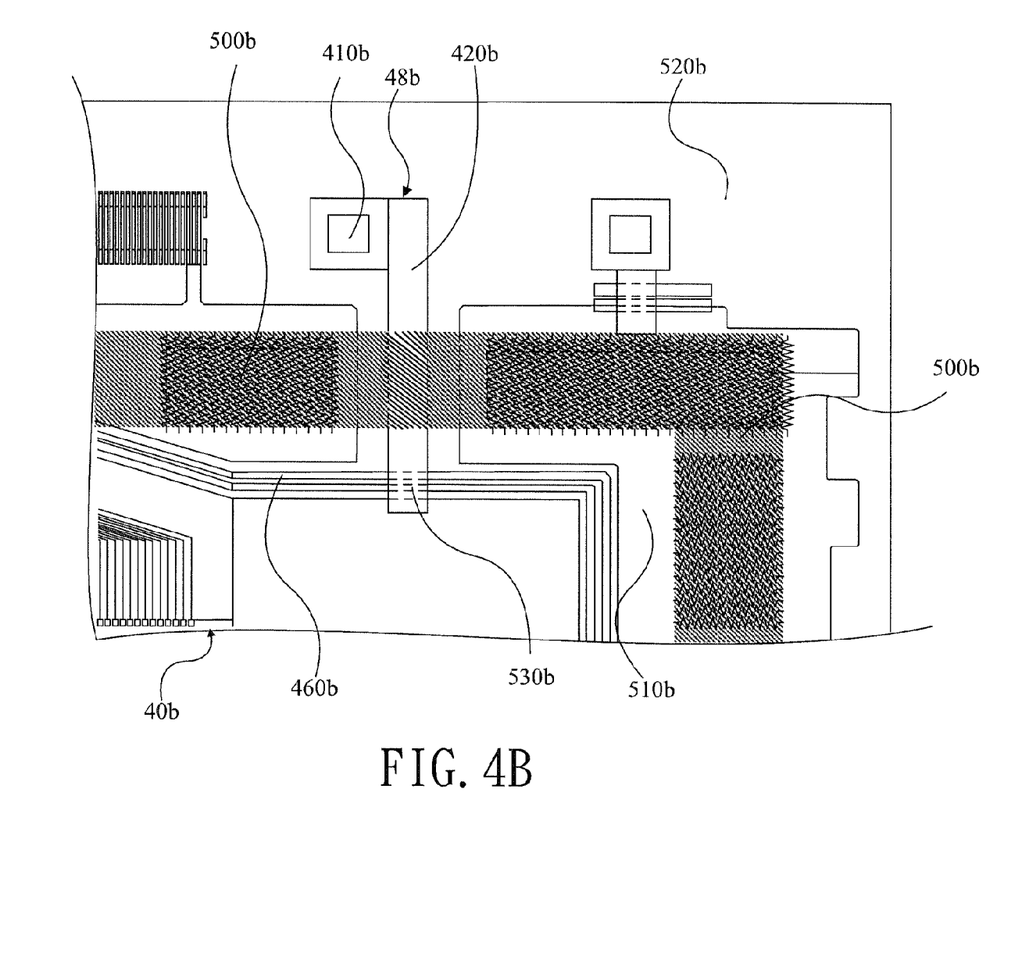
FIG. 4B is a schematic partial view of a thin film transistor substrate according to the second embodiment of the present invention, wherein the partial view shows a portion of source side located on the substrate.

FIG. 4B is a schematic partial view of a thin film transistor substrate according to the second embodiment of the present invention, wherein the partial view shows a portion of source side located on the first substrate 40b. As shown in FIG. 4BA, a curing line structure 48b suitable for a phase separation alignment (PSA) process includes a contact pad 410b and a transmission line 420b. The difference between FIG. 4B and FIG. 4A is described as follows. The transmission line 420b extends from the contact pad 410b within the periphery area 520b and passes over the sealant-distributing area 500b. If the transmission line 420b is electrically connected to the other adjacent transmission line 460b on the first substrate 40b and thus a striding, bridging, or through-hole connection is utilized, it is required that the striding, bridging, or through-hole connection needs to be positioned outside the sealant-distributing area 500b, such as within the periphery area 520b. The transmission line 420b separates from the other adjacent transmission line 460b at a predetermined interval. The predetermined interval ensures that the transmission line 420b electrically isolates from the other transmission lines to prevent the curing line from burning down.

The present invention provides a liquid crystal display panel, a thin film transistor array substrate and a curing line structure thereof in use of phase separation alignment process so that the transmission line of the curing line does not connect to the other transmission line by a striding, bridging, or through-hole connection and the transmission line of the curing line does not pass through the bottom of the sealant-distributing area. Consequently, when a curing step in the PSA process is performed on the curing line structure, the problem of which the transmission line is burned down due to high resistivity is solved for increasing the yield rate of the liquid crystal display panel.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A curing line structure for a phase separation alignment (PSA) process of a liquid crystal display panel, wherein the liquid crystal display panel has a first substrate and a second substrate opposite to the first substrate, and the first substrate has a periphery area, a display area, and a sealant-distributing area between the periphery area and the display area, the curing line structure comprising:
a contact pad positioned on the periphery area for receiving a control voltage for performing the PSA process; and
a transmission line extending from the contact pad and passing over the sealant-distributing area for connecting to at least one common line within the display area, wherein the transmission line is composed of metal having low resistance.

2. The curing line structure of claim 1, wherein the first substrate is a thin film transistor array substrate and a plurality of thin film transistors are positioned on the display area of the thin film transistor array substrate.

3. The curing line structure of claim 2, wherein a plurality of scan lines intersects a plurality of data lines on the display area of the thin film transistor array substrate, each intersection of the scan lines and the data lines has a transistor, and an electrode of the transistor is electrically connected to a pixel electrode.

4. The curing line structure of claim 3, wherein a plurality of scan driving chips and a plurality of data driving chips in the periphery area are electrically connected to the gate lines and the source lines.

5. The curing line structure of claim 1, wherein the control voltage is in an alternating current type.

6. The curing line structure of claim 1, wherein the control voltage is in a direct current type.

7. The curing line structure of claim 1, wherein a material of the transmission line is selected from the group consisting of aluminum (Al), titanium (Ti), cupper (Cu), neodymium (Nd), molybdenum (Mo), and a combination thereof.

8. The curing line structure of claim 1, wherein the transmission line extends from the contact pad and separates from the adjacent transmission lines at a predetermined interval for electrically connecting the transmission line to the at least one common line, and the predetermined interval ensures that the transmission line electrically isolates from the adjacent transmission lines.

9. A thin film transistor array substrate for a phase separation alignment (PSA) process, the thin film transistor array substrate comprising:
a substrate having a display area, a periphery area, and a sealant-distributing area disposed between the display area and the periphery area;
a plurality of scan lines, a plurality of data lines, and a plurality of common lines disposed on the display area; and
at least one curing line composed of a material of metal having low resistance and including a contact pad and a transmission line, wherein the contact pad positioned on the periphery area receives a control voltage to determine a pre-tilt angle of the liquid crystal, and the transmission line extends from the contact pad and passing over the sealant-distributing area for connecting to at least one common line within the display area.

10. A liquid crystal display panel for a phase separation alignment (PSA) process, the liquid crystal display panel comprising:
a first substrate and a second substrate opposite to the first substrate, the first substrate having a display area, a periphery area, and a sealant-distributing area disposed between the display area and the periphery area, the first substrate comprising:
a plurality of scan lines and a plurality of data lines positioned on the display area controlling liquid crystal to generate a plurality of pixels, and a plurality of common lines disposed on the display area; and
at least one curing line composed of a material of metal having low resistance and including a contact pad and a transmission line, wherein the contact pad positioned on the periphery area receives a control voltage to determine a pre-tilt angle of the liquid crystal, and the transmission line extends from the contact pad and pass over the sealant-distributing area for connecting to at least one common line within the display area.

11. The liquid crystal display panel of claim 10, wherein the first substrate is a thin film transistor array substrate and a plurality of thin film transistors are positioned on the display area of the thin film transistor array substrate for controlling the twist direction of the liquid crystal.

12. The liquid crystal display panel of claim 11, wherein a plurality of scan lines intersects a plurality of data lines on the display area of the first substrate, each intersection of the scan lines and the data lines has a transistor, and a electrode of the transistor is electrically connected to a pixel electrode for controlling a twist direction of the liquid crystal.

13. The liquid crystal display panel of claim 10, wherein the control voltage is in an alternating current type.

14. The liquid crystal display panel of claim 10, wherein the control voltage is in a direct current type.

15. The liquid crystal display panel of claim 10, wherein the transmission line extends from the contact pad and separates from adjacent transmission lines at a predetermined interval for electrically connecting the transmission line to the at least one common line, and the predetermined interval ensures that the transmission line electrically isolates from the adjacent transmission lines.

16. The liquid crystal display panel of claim 10, wherein a material of the transmission line is selected from the group consisting of aluminum (Al), titanium (Ti), cupper (Cu), neodymium (Nd), molybdenum (Mo), and a combination thereof.

* * * * *